(12) United States Patent
Rantanen

(10) Patent No.: US 9,784,331 B2
(45) Date of Patent: Oct. 10, 2017

(54) METHOD AND APPARATUS FOR RECEIVING OF A CYLINDRICAL BODY AND THE USE OF THE METHOD AND THE APPARATUS

(71) Applicant: Sovellusmestarit Oy, Provoo (FI)

(72) Inventor: Mikko Rantanen, Porvoo (FI)

(73) Assignee: Sovellusmestarit Oy, Porvoo (FI)

( * ) Notice: Subject to any disclaimer, the term of this patent is extended or adjusted under 35 U.S.C. 154(b) by 36 days.

(21) Appl. No.: 14/786,183

(22) PCT Filed: Apr. 23, 2014

(86) PCT No.: PCT/FI2014/050293
§ 371 (c)(1),
(2) Date: Oct. 22, 2015

(87) PCT Pub. No.: WO2014/174151
PCT Pub. Date: Oct. 30, 2014

(65) Prior Publication Data
US 2016/0084335 A1     Mar. 24, 2016

(30) Foreign Application Priority Data

Apr. 24, 2013 (FI) .................................. 20130125

(51) Int. Cl.
| | |
|---|---|
| *B65G 7/10* | (2006.01) |
| *F16F 9/04* | (2006.01) |
| *F16F 9/50* | (2006.01) |
| *F16F 9/00* | (2006.01) |

(52) U.S. Cl.
CPC .............. *F16F 9/0418* (2013.01); *B65G 7/10* (2013.01); *F16F 9/003* (2013.01); *F16F 9/0481* (2013.01); *F16F 9/50* (2013.01)

(58) Field of Classification Search
CPC .................................. F16F 9/0418; B65G 7/10
USPC .......... 414/746.4; 198/463.3; 193/35 SS, 38, 193/40
See application file for complete search history.

(56) References Cited

U.S. PATENT DOCUMENTS

| | | | |
|---|---|---|---|
| 3,360,096 A | 12/1967 | Moore et al. ...................... 198/1 |
| 3,610,392 A * | 10/1971 | Parker ...................... B65G 7/10 | 104/155 |
| 4,736,780 A * | 4/1988 | Matsuo .............. B23K 35/0222 | 141/82 |

(Continued)

FOREIGN PATENT DOCUMENTS

| | | |
|---|---|---|
| EP | 1 216 945 A2 | 6/2002 |
| EP | 1 707 508 A1 | 10/2006 |

(Continued)

*Primary Examiner* — Douglas Hess
(74) *Attorney, Agent, or Firm* — Harrington & Smith

(57) ABSTRACT

The invention relates to a method and an apparatus for receiving cylindrical bodies. In the method according to the invention, the receiving utilizes tight, self-restoring pressure elements, in which by adjusting the inflow and/or outflow of compressed air, the motion speed of the cylindrical body is decelerated. The apparatus according to the invention includes a pressure element within the elastic and tight material of which is installed self-restoring porous material. Furthermore, the invention relates to the use of the method and the apparatus for receiving a cylindrical body.

10 Claims, 11 Drawing Sheets

(56) References Cited

U.S. PATENT DOCUMENTS

| | | | | |
|---|---|---|---|---|
| 5,096,135 A * | 3/1992 | Eichenberger | ....... | B65H 67/064 242/557 |
| 5,201,400 A * | 4/1993 | Abe | ...................... | B65G 35/00 198/463.3 |
| 6,012,893 A * | 1/2000 | Drei | ...................... | B23Q 7/001 414/746.2 |
| 8,257,010 B2 * | 9/2012 | Hirosawa | ................ | B23B 13/02 414/746.1 |
| 8,752,691 B2 * | 6/2014 | Cristoforetti | ........ | B65G 47/647 198/369.2 |
| 8,899,901 B2 * | 12/2014 | Hilton | .................... | E21B 19/14 414/22.54 |
| 9,028,198 B2 * | 5/2015 | Schopf | .................. | B23K 26/38 414/745.1 |
| 9,199,511 B2 * | 12/2015 | Hodges | .................. | B60B 30/00 |
| 2007/0036947 A1 | 2/2007 | Barwick | ...................... | 428/178 |

FOREIGN PATENT DOCUMENTS

| | | | |
|---|---|---|---|
| FI | | 923815 A | 2/1994 |
| WO | WO 2005/058735 A1 | | 6/2005 |

* cited by examiner

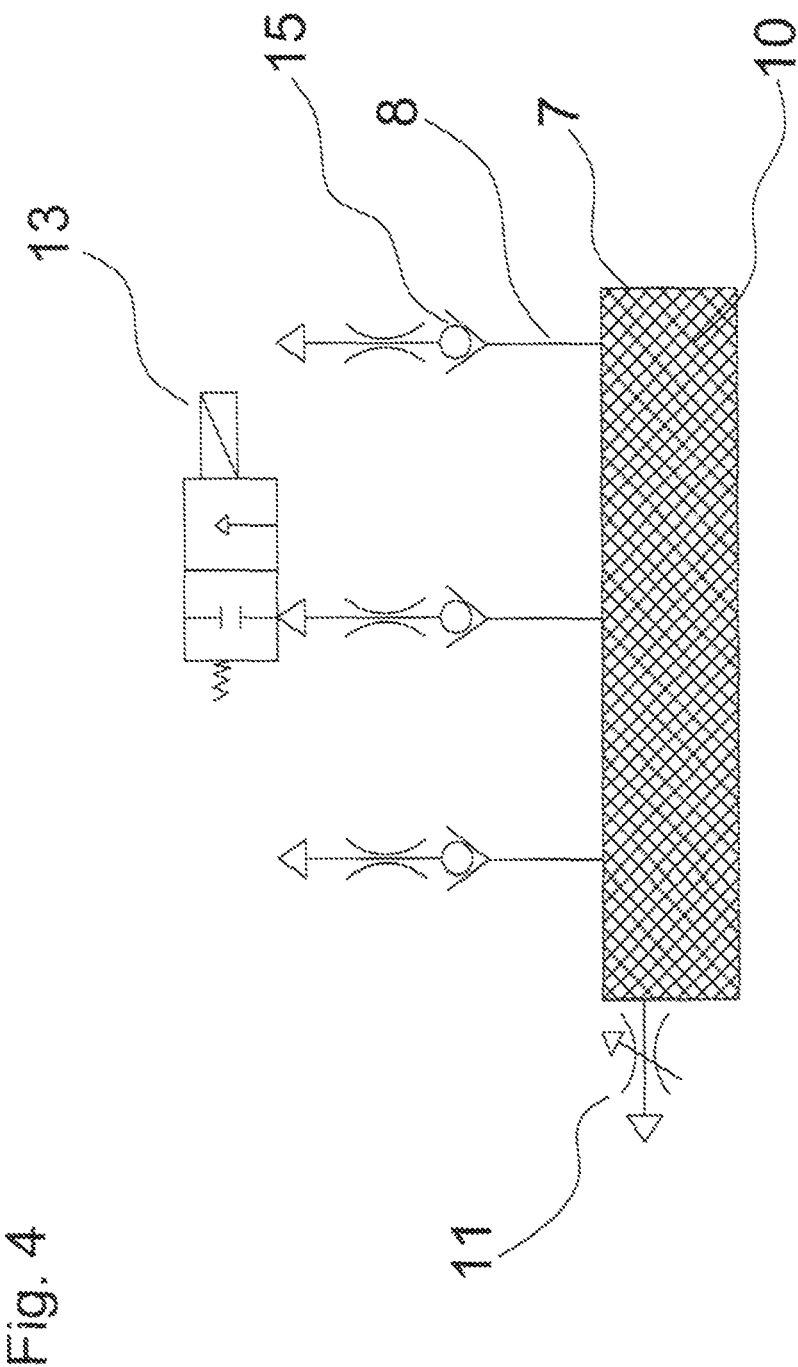

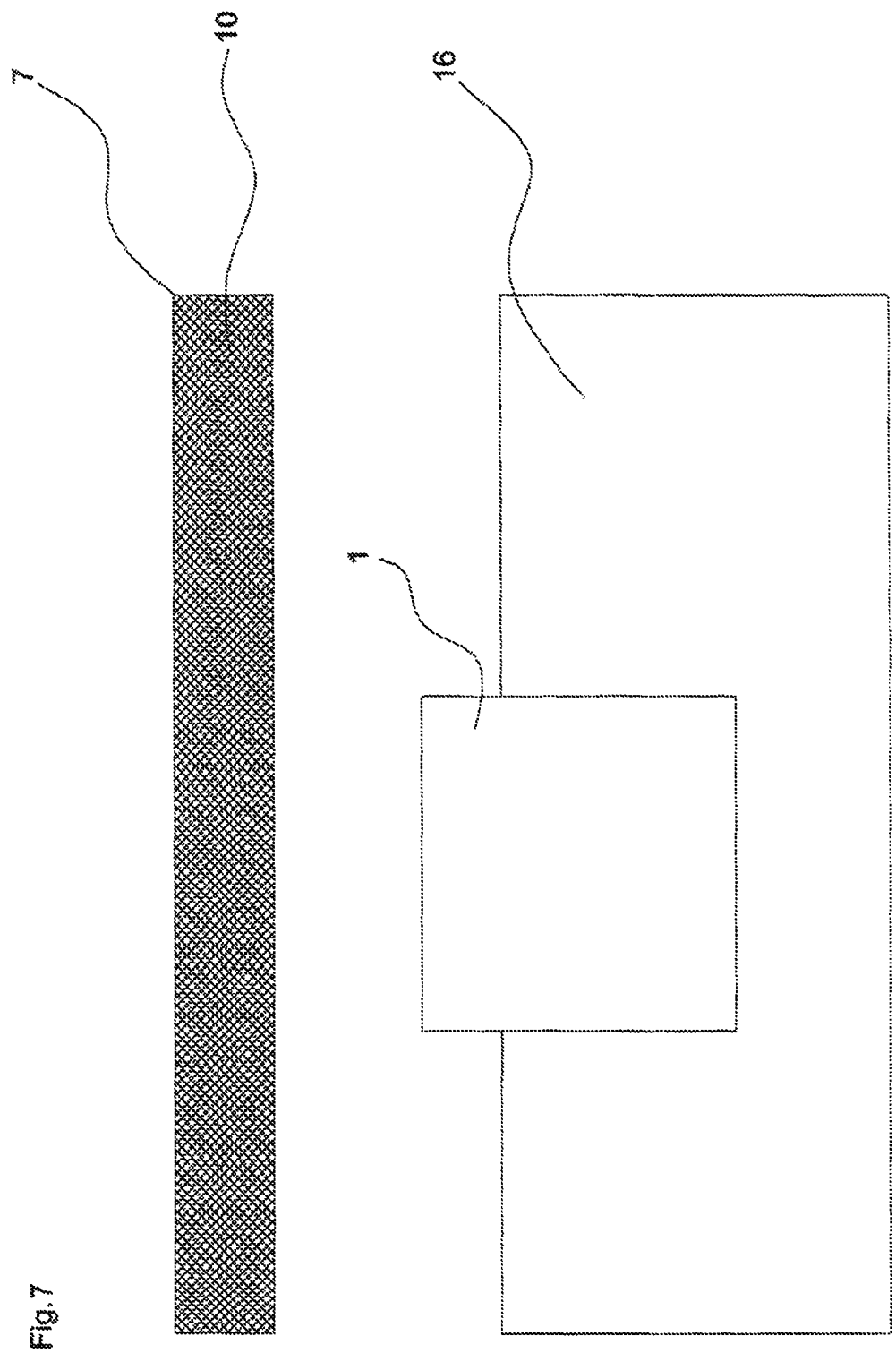

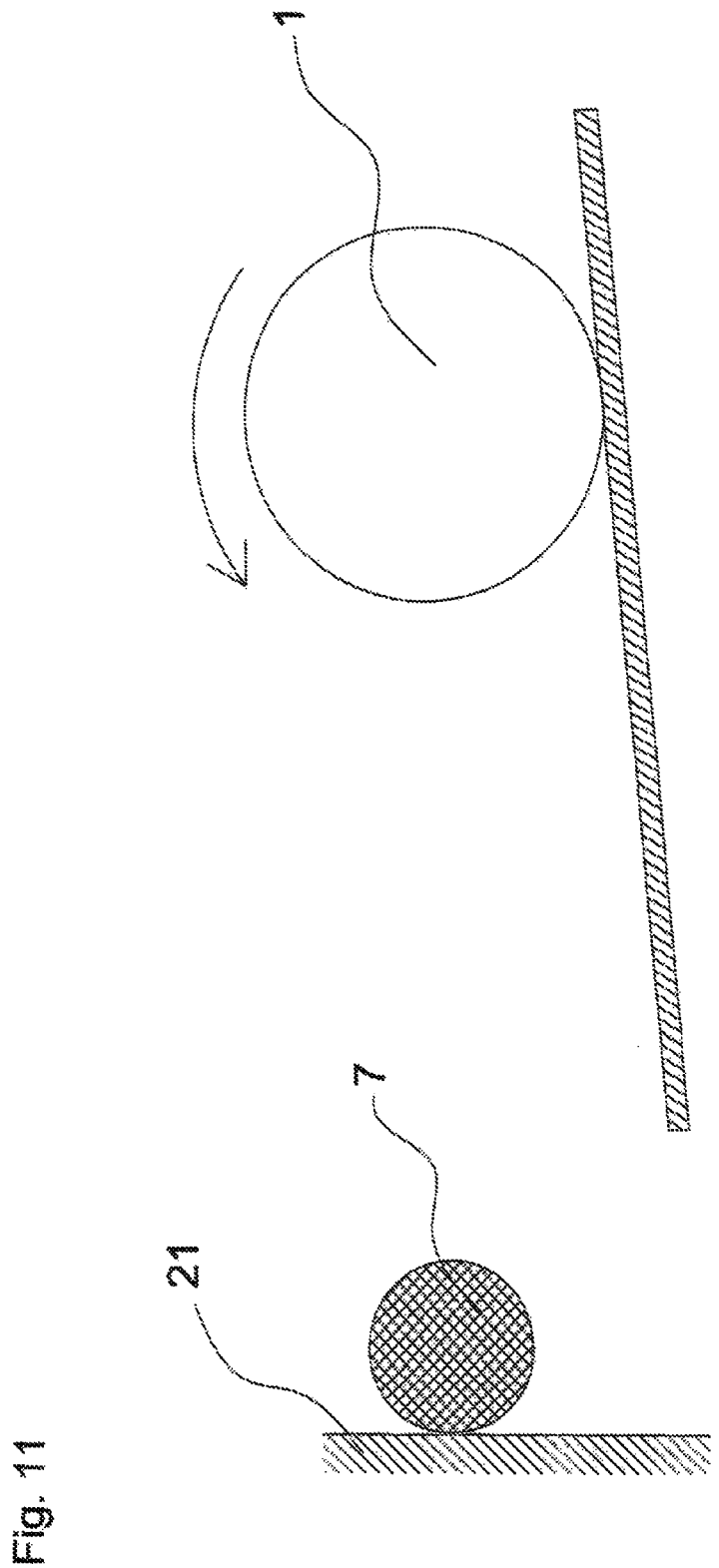

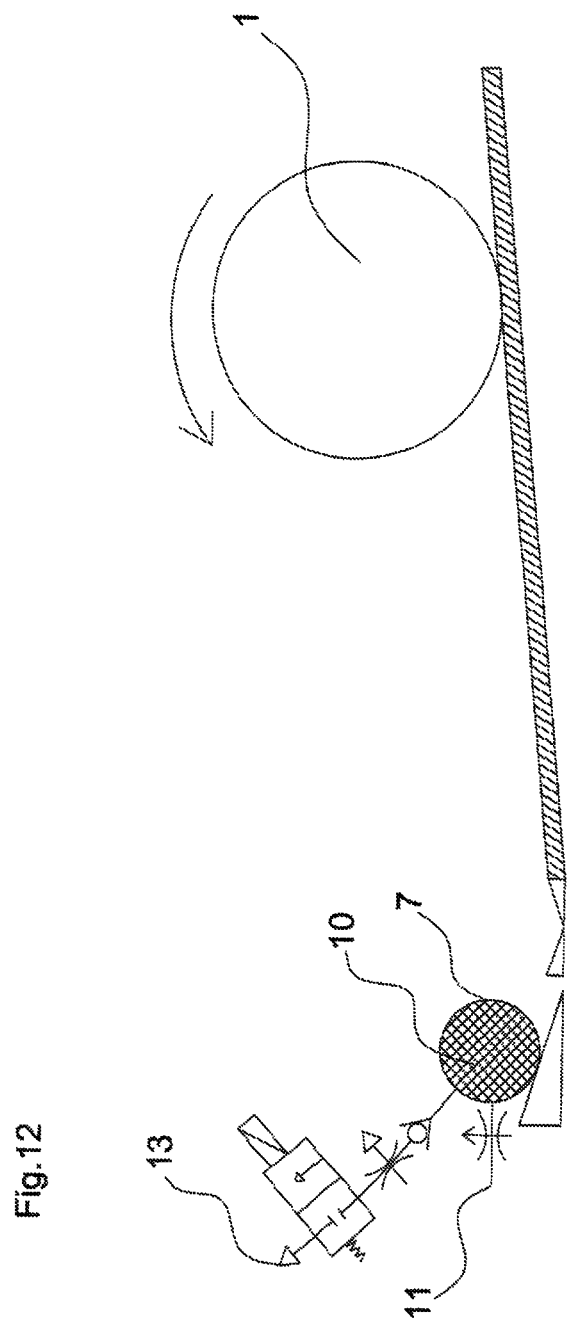

METHOD AND APPARATUS FOR RECEIVING OF A CYLINDRICAL BODY AND THE USE OF THE METHOD AND THE APPARATUS

The invention relates to a method and an apparatus for receiving a cylindrical body. Furthermore, the invention relates to the use of the method and the apparatus, by means of which, it is possible to save energy and receive cylindrical bodies, e.g. paper reels.

It is challenging to receive and stop cylindrical bodies in high motion speeds. Recent apparatuses operate either pneumatically, hydraulically or by means of electric motors. The amount of energy they consume is considerable. It is generally known that the receiving can also be performed by a steel stopper, whereby the receiving is extremely vigorous and the cylindrical body will catapult back.

A usual procedure for receiving a cylindrical body is receiving which occurs by pneumatic or hydraulic cylinders. Then, energy is supplied to an extremely large cylinder and the receiving takes place by removing this energy from the cylinder, whereby it moves downwards. In practice, such arrangements provide satisfactory receiving but they consume a remarkable amount of energy.

Another conventional procedure is a steel stopper against which a cylindrical body comes. This procedure does not consume energy, because the cylindrical body climbs uphill, whereby its speed will decelerate. A disadvantage of this arrangement is that energy does not disappear but the cylindrical body will start to return downwards. Thus, this conventional arrangement is poor of its receiving properties and the receiving takes a long time.

It is known that the receiving capacity of a fixed steel stopper, that is, the force incurred by mass and speed to the stopper can be intensified without energy by pneumatic bellows or a pneumatic hose. This method does not remove energy in receiving but operates as a pneumatic spring and the cylindrical body gets its energy back when the cylindrical body starts to slip in the return direction.

The object of the invention is to introduce a method and an apparatus which eliminate disadvantages of prior art and especially decrease consumption of energy and provide a better receiving capability. A particular object is to introduce a method and an apparatus, by means of which, cylindrical bodies can be received controllably without consuming large amounts of energy and such that the system is not connected to any source of energy. The object is namely to provide a method and an apparatus intended for its use, by means of which, it is possible to reach considerable savings in costs and improvements in functionality for recent methods and apparatuses. A further object of the invention is to introduce the use of the method and the apparatus for these purposes.

The object of the invention is provided by a method, an apparatus and their use which are characterised by what is described in the attached claims.

In the method according to the invention, the receiving of cylindrical bodies utilises tight, self-restoring pressure elements, in which, the inflow and/or outflow of compressed air is adjusted and the motion speed of a cylindrical body is decelerated.

In an advantageous embodiment of the invention, the apparatus restores to receiving readiness due to self-restoring material. Thus, there is no need to connect the apparatus to any source of energy.

In an additional advantageous embodiment of the invention, the power of the receiving of a cylindrical body is adjusted by changing the size and/or number of outlet flues of the pressure elements.

In a further advantageous embodiment of the invention, the amount of return flow is adjusted by the size of the flue or flues of the pressure elements, chokers and/or check valves installed in them. The power of return flow is advantageously adjusted by electromagnetic valves.

In an additional advantageous embodiment of the invention, the receiving of a cylindrical body utilises several smaller pressure elements which are installed side by side and/or one after the other and such that no empty gaps remain in the receiving.

According to the invention, a tight, elastic pressure element, which can be a hose, bellows, a rubber mat or some other tight and elastic element, includes within it self-restoring porous material which restores itself to the receiving form by itself. The actual receiving and deceleration of the cylindrical body occurs by controlling the amount of air being let out. Such a method and an apparatus provide excellent receiving and energy-efficiency.

In the receiving situation, the following occurs in practice: As the cylindrical body arrives to the stopper, the body starts to compress the pressure element to collapse, whereby pressure within the pressure element increases and starts to decelerate the advance of the cylindrical body. The pressure increases and its outlet are controlled such that a part of air as large as possible has discharged at the end of receiving. Then as the cylindrical body starts its return motion from the stopper, no thrust is applied from the stopper due to the pressure. The self-restoring material restores itself so slowly that it applies no thrust to the cylindrical body. This method provides a good damping ability without the apparatus consuming energy.

The amount of air being let out depends on the weight and motion speed of the body being received. In the invention, the amount of choked outlet air is the energy which can be damped. The restoring of the self-restoring material occurs in the invention so slowly that it incurs no thrust to the cylindrical body.

The method and/or the apparatus according to the invention are particularly used for receiving a cylindrical body, whereby energy is saved and other considerable advantages are provided.

Next, the invention will be described in more detail with reference to the attached illustrations of principle on the method according to the invention and the construction of the apparatus.

FIG. 4 shows a construction according to the invention.

FIGS. 7 and 8 show the use alternatives of the construction according to FIG. 4.

FIGS. 10 and 11 show the uses of the apparatus according to the invention.

FIG. 12 shows an embodiment of the operation of the apparatus according to the invention.

Figure 1:
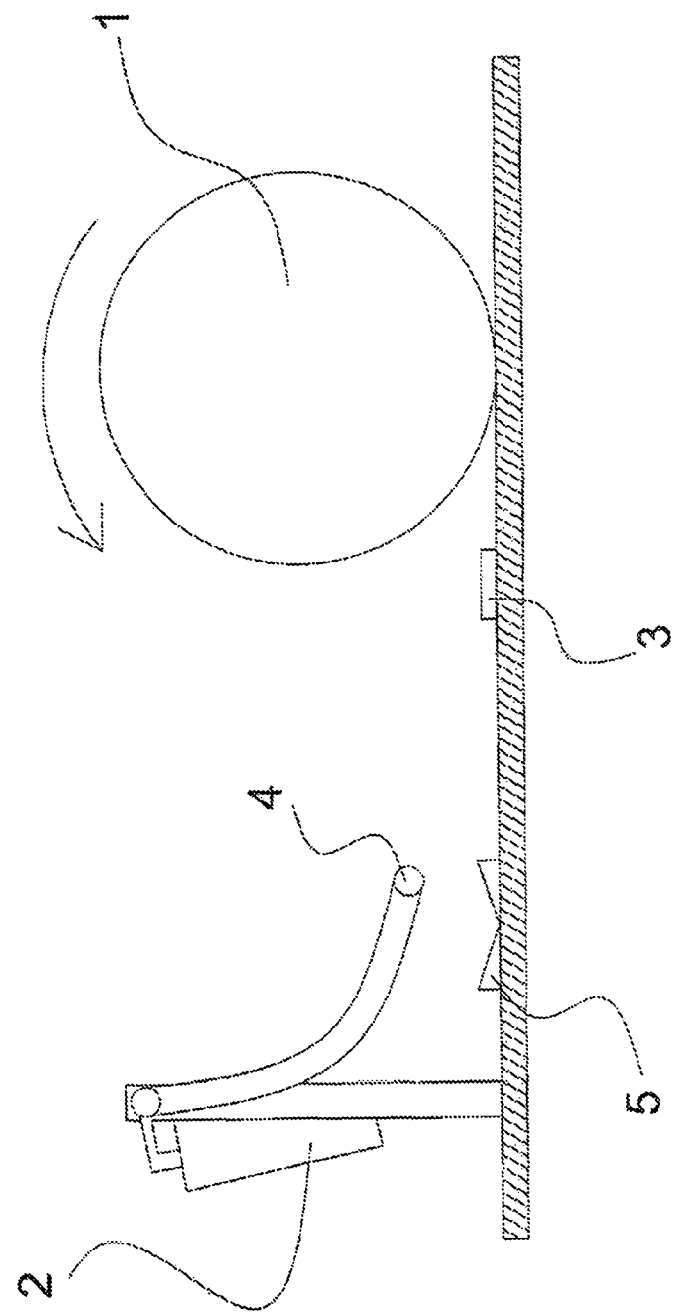
FIGS. 1 and 2 show how to operate in the method according to prior art.

FIG. 1 shows a typical receiving apparatus which utilises a pneumatic cylinder 2 and an arm 4 fastened to it when receiving. As the cylindrical body 1 arrives to the receiver, the pneumatic cylinder 2 starts its motion from the effect of a sensor 3. When meeting, the receiver arm 4 and the cylindrical body 1 have almost the same motion speed. After this, the pneumatic cylinder 2 returns the apparatus and the cylindrical body has been received to a substation 5. Such an apparatus is known and its use requires a lot of energy.

Figure 2:
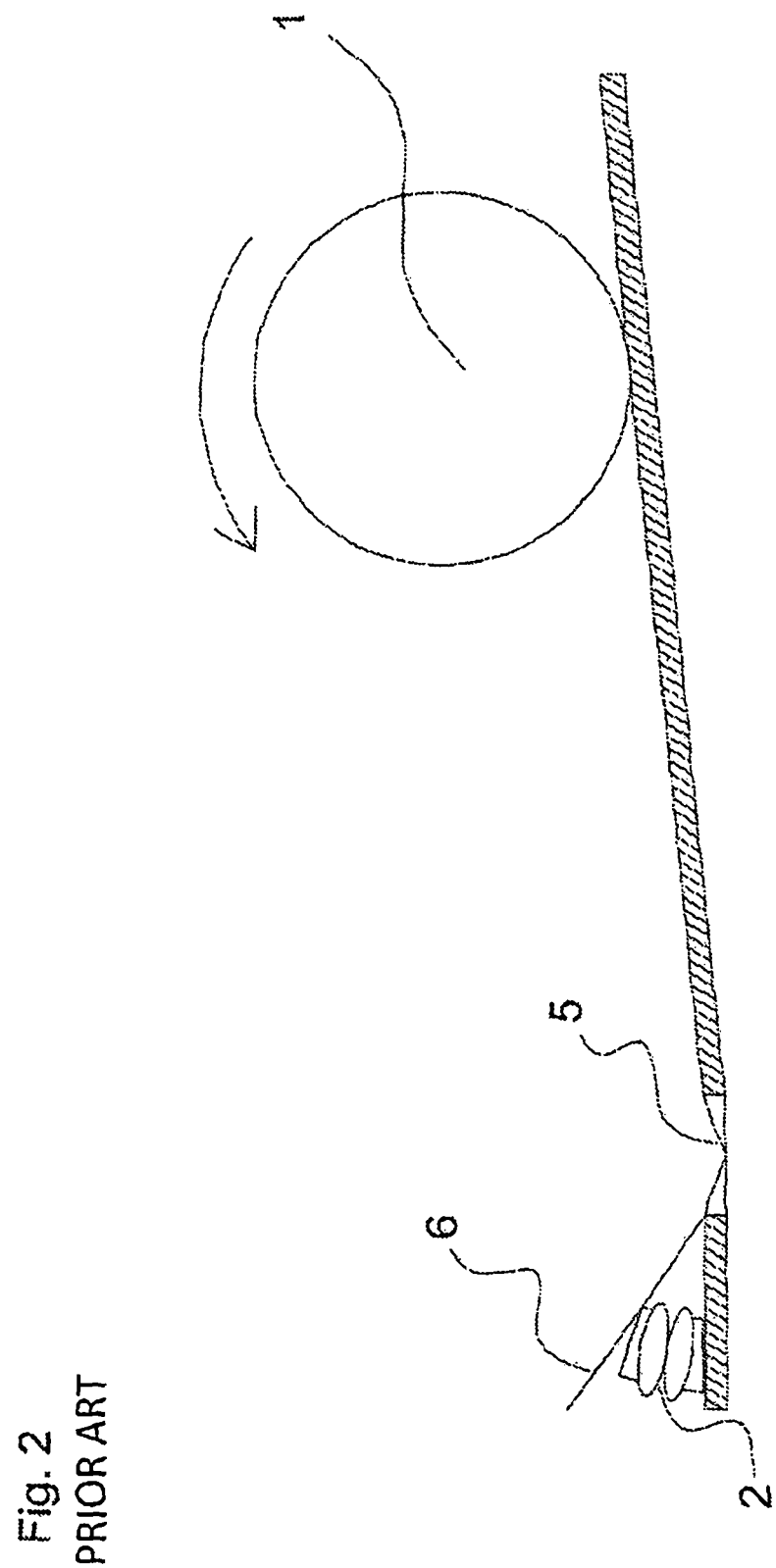

In FIG. 2, a cylindrical body 1 arrives downwards and goes over a substation 5 and hits a steel stopper 6 which includes a pneumatically-operated cylinder 2 as pressurised. In this case, the pneumatically-operated cylinder does not assist in receiving but operates as a pneumatic spring. Such an apparatus is known and, irrespective of using the pneumatic cylinder 2 or not, a reel starts to roll at an extremely high kinetic energy back in the incoming direction.

Figure 3:
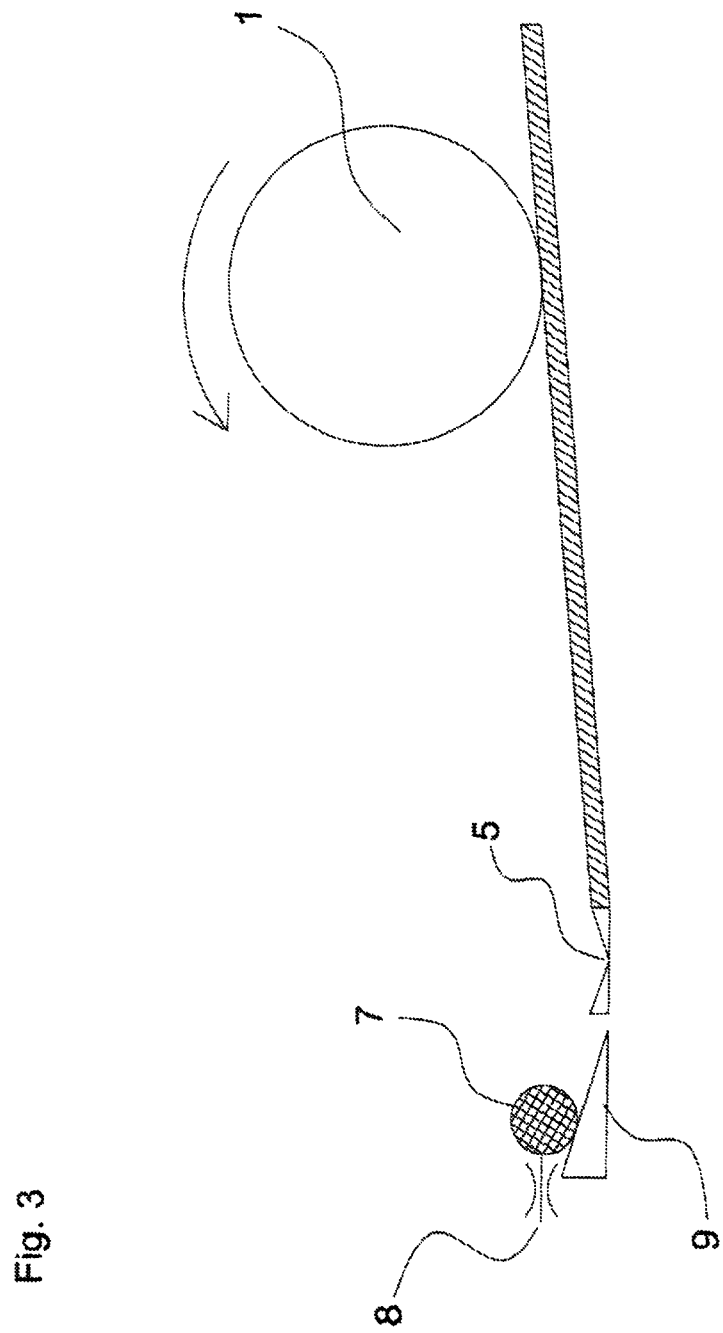
FIG. 3 shows how the construction according to the invention operates.

FIG. 3 shows an arrangement according to the invention. A cylindrical body 1 (a reel) arrives downwards and goes over a substation 5 and hits an apparatus according to the invention in which a pressure element 7 decelerates the motion speed of the reel when compressing. Air discharges controlledly from discharge flues 8 of the pressure element, and the apparatus does not incur thrust as the cylindrical body departs back to the substation 5 from a considerably less sloping stopper 9. This apparatus improves the stopping of the cylindrical body substantially compared with the known apparatus/method shown in FIG. 2 and saves energy significantly compared with the known apparatus/method shown in FIG. 1.

Figure 6:
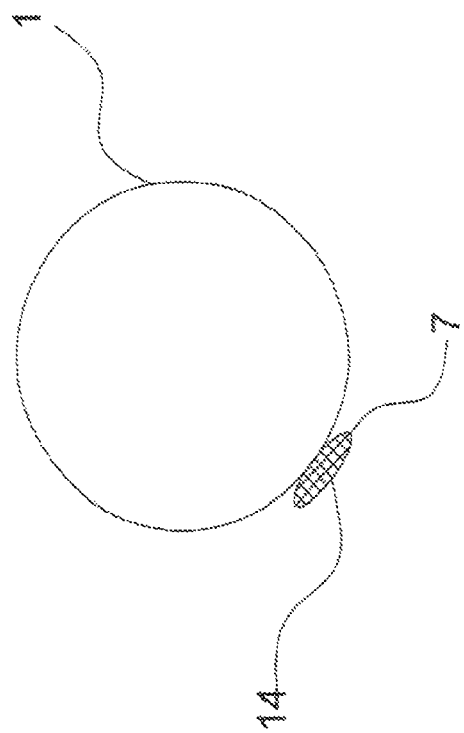
FIGS. 5 and 6 show how the construction according to FIG. 4 operates.
Figure 5:
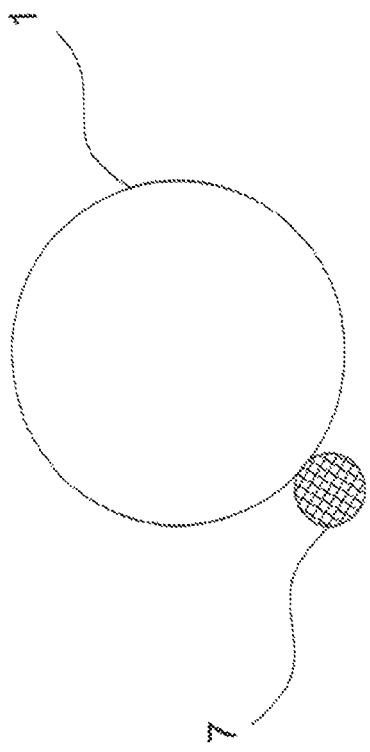

FIGS. 4, 5 and 6 show by usual graphic symbols and conceptual drawings of the field the operation of an apparatus according to the invention. The apparatus includes a pressure element 7 manufactured of elastic material within which is located porous material 10. The pressure element includes air discharge flues 8 the size of which can be adjusted by electromagnetic valves 13 or by check valves 15.

The elastic pressure element 7 and the porous self-restoring material 10 make the pressure element swell for receiving. Swelling speed can be adjusted by adjusting the amount of air flowing within by a choke 11. As the cylindrical body 1 hits the pressure element 7 in a way shown in FIG. 5, the pressure within the pressure element 7 increases. The pressure increase provides the deceleration of the reel. The pressure increase can be adjusted by the number of the discharge flues 8 in the pressure element and by means of the size of the flue. Using electromagnetic valves 13 enables adjusting discharge flow as the weight and the speed of the cylindrical body varies by opening or closing the flues. When the pressure element 7 has compressed totally 14 in a way shown by FIG. 6, choked outflown air has increased pressure in the pressure element and performed damping.

To decelerate the restoring of the pressure element, it is possible to provide the discharge flues 8 with check valves 15. The apparatus restores to receiving readiness by the force of the self-restoring material. This speed is adjusted by adjusting the amount of inflowing air by chokers 11. The choker 11 also provides that the self-restoring material 10 does not push the cylindrical body 1 and thus accelerate its speed.

Figure 8:
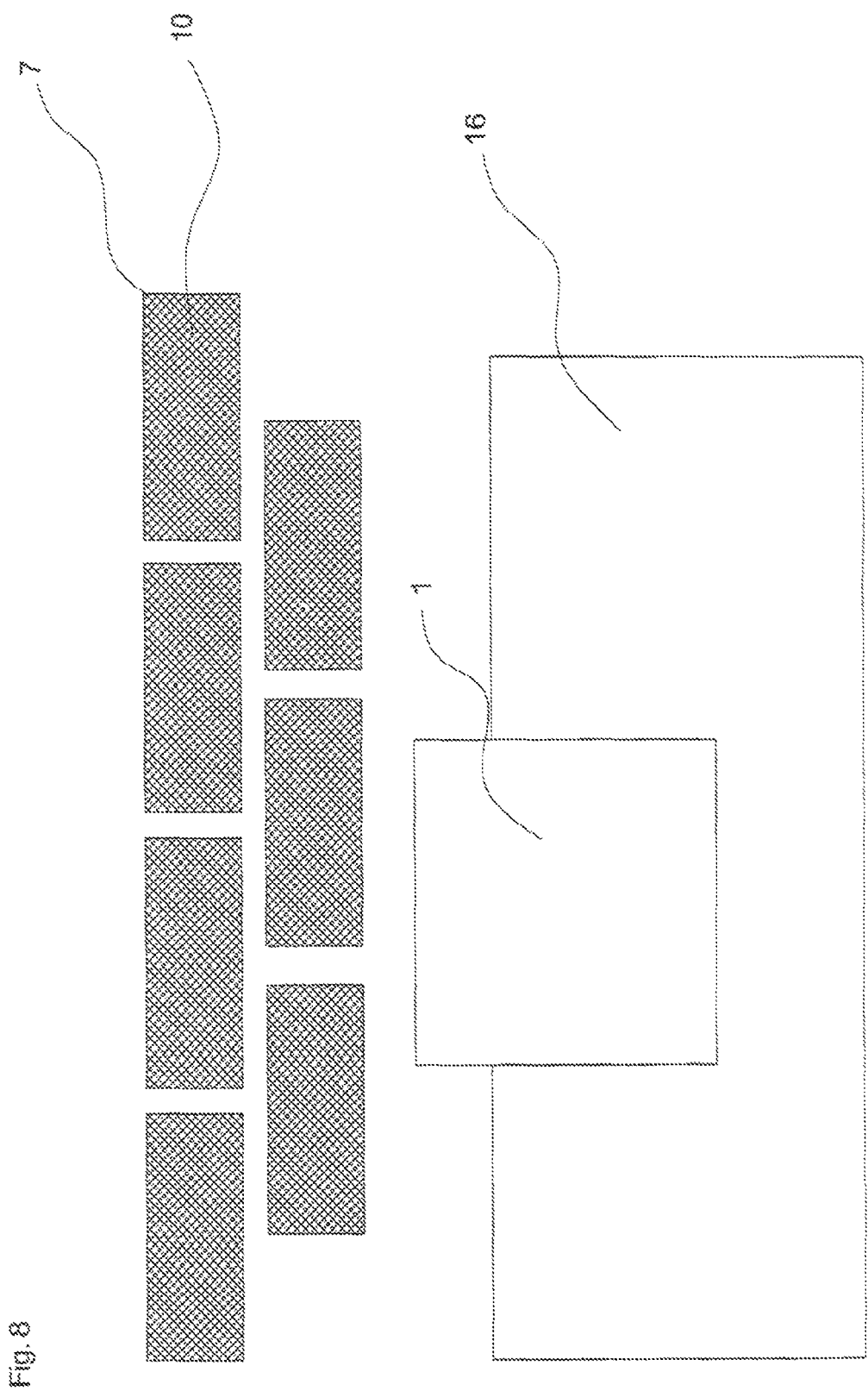

FIGS. 7 and 8 show two different implementations of the invention. In FIG. 7, there is one pressure element 7 which is filled with self-restoring material 10. This receives a very wide cylindrical body 16, but the power of receiving weakens at the point of a narrow cylindrical body 1. This is due to the fact that there is room in the pressure element where the air escapes and from which it can deliver energy back to the reel.

FIG. 8 shows several smaller pressure elements 7 which are filled with self-restoring material 10. The pressure elements are installed side by side and in two rows. Such an apparatus will receive both the wide 16 and the narrow 1 cylindrical body well. This is due to the fact that air discharges totally from the pressure elements in the receiving situation and no remaining energy occurs. By setting the pressure elements in this way, no empty gaps remain in the receiving and the receiving of the cylindrical body is improved.

Figure 9:
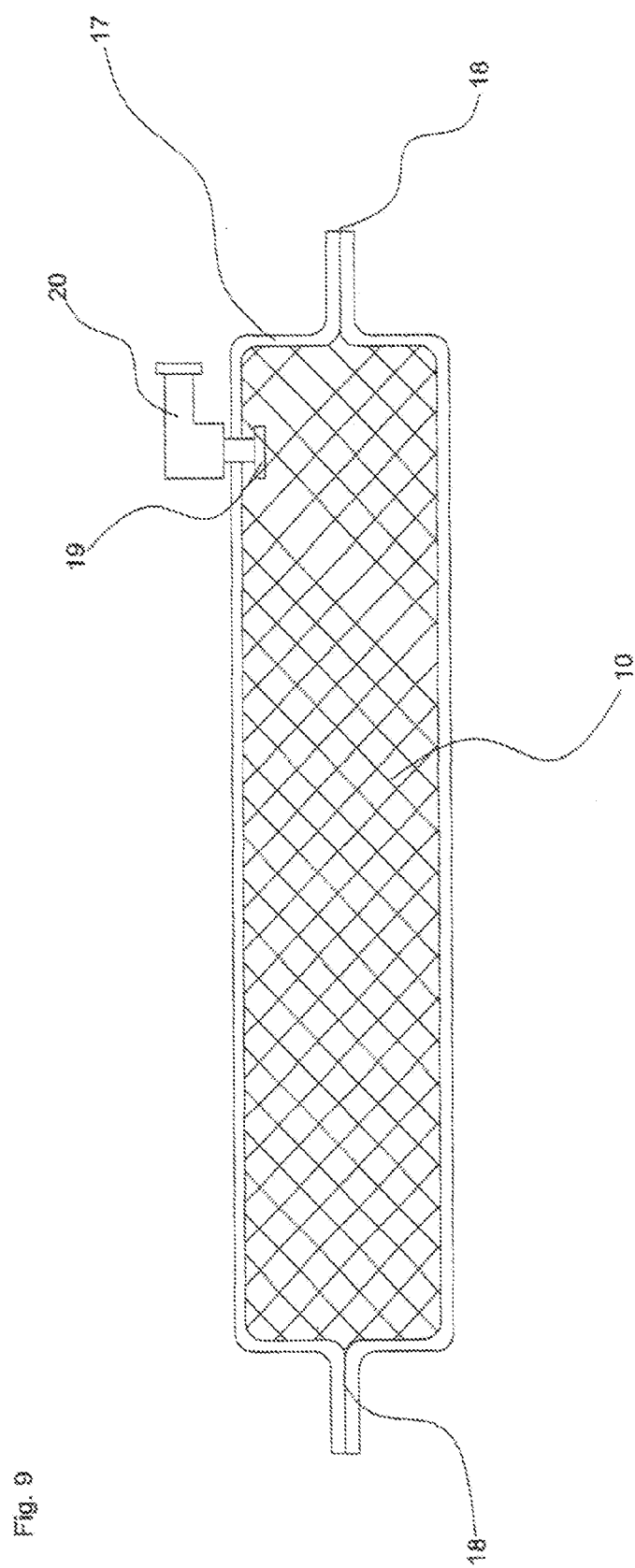
FIG. 9 shows the construction of an apparatus according to the invention.

FIG. 9 shows a practical embodiment of a pressure element. Elastic and tight surface material 17 of the pressure element is sealed at ends 18 and thus made air-tight. Within the elastic pressure element is installed self-restoring porous material 10, such as e.g. foam plastic. For pneumatic connections, the pressure element is provided with one tight connection or several tight connections using pneumatic connectors 20 and retaining nuts 19. Even though FIG. 9 shows the construction of the pressure element in a very simple way, it is evident that the sealing or pneumatic connections can be implemented also in other known ways.

Figure 10:
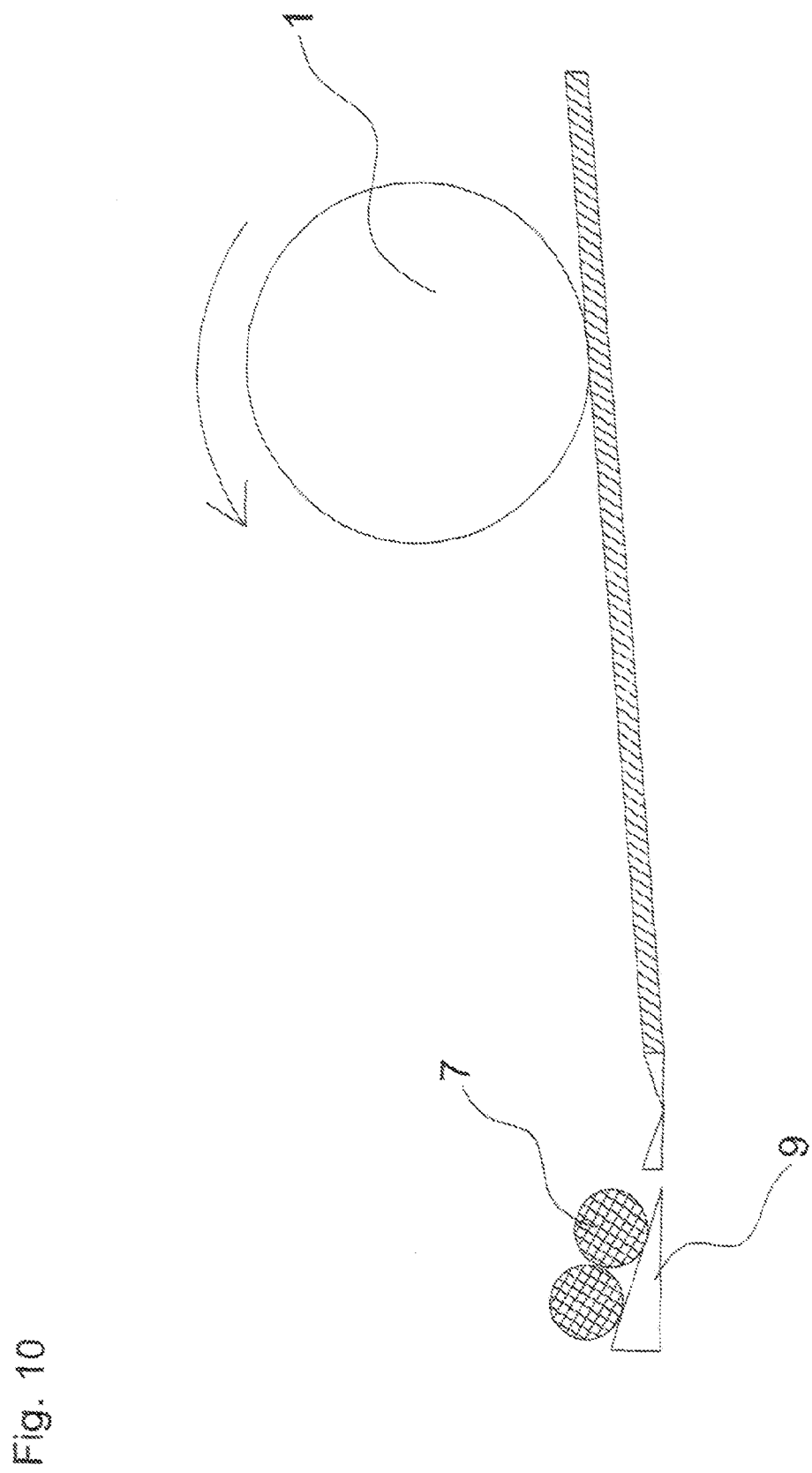

FIG. 10 shows an embodiment of the invention. Self-restoring pressure elements 7 are installed one after the other on a slightly sloping plane 9. As a cylindrical body 1 arrives, it starts to compress the pressure elements 7 which provide increase in pressure and deceleration of the cylindrical body.

FIG. 11 shows another common embodiment of the invention. A self-restoring pressure element 7 is installed in a wall 21. As a cylindrical body 1 hits the wall, the pressure element performs damping.

FIG. 12 shows an embodiment of the operation of the apparatus according to the invention. The operation corresponds to that shown in FIG. 3. In this figure, the apparatus is shown with a self-restoring pressure element 7 which includes porous material 10, a valve 13 and a choker 11 of inflowing air.

The method and the apparatus according to the invention can be applied for various different purposes. An interesting utilisation area is the papermaking industry where a lot of paper reel transfers are performed. In these application targets, the construction according to the invention enables gentler reel handling without consuming energy.

It is evident that the invention is not limited to the above applications and utilisation environment, but it has various uses in many fields. The invention can be applied in many ways within the scope of the inventive basic idea and the attached claims.

The invention claimed is:

1. A method comprising:
  receiving cylindrical bodies by utilising elastic pressure elements, wherein the elastic pressure elements each comprise a self-restoring porous material, and in which by adjusting inflow and/or outflow of compressed air, a motion speed of the cylindrical body is decelerated, and
  restoring the elastic pressure elements to receiving readiness due to the self-restoring porous material.

2. A method according to claim 1, wherein
  adjusting a power of receiving by changing the size and/or number of air discharge flues of the elastic pressure elements.

3. A method according to claim 1, wherein
  adjusting the amount of air flow by the size of the flue/flues, chokers and/or check valves.

4. A method according to claim 3, wherein
  adjusting the flow intensity of air flow by electromagnetic valves.

5. A method according to claim 1, wherein
utilising in the receiving several smaller pressure elements.

6. An apparatus configured to receive a cylindrical body, wherein the apparatus includes a pressure element and an adjusting mechanism, wherein the pressure element comprises a self-restoring porous material, and wherein the adjusting mechanism is configured to adjust inflow and/or outflow of compressed air.

7. An apparatus according to claim 6, in which
to the pressure element comprises a pneumatic connector configured to control air flow.

8. An apparatus according to claim 6, wherein the pressure elements are installed in two rows such that no empty gaps remain when the cylindrical body is received.

9. An apparatus according to claim 6, in which
the apparatus includes chokers installed in flues to control the amount of outflowing air.

10. An apparatus according to claim 6, in which
the apparatus includes electromagnetic valves to control the amount of outflowing air.

* * * * *